US007564874B2

(12) United States Patent
King

(10) Patent No.: US 7,564,874 B2

(45) Date of Patent: Jul. 21, 2009

(54) ENHANCED BANDWIDTH DATA ENCODING METHOD

(75) Inventor: Carey King, Austin, TX (US)

(73) Assignee: Uni-Pixel Displays, Inc., The Woodlands, TX (US)

( * ) Notice: Subject to any disclaimer, the term of this patent is extended or adjusted under 35 U.S.C. 154(b) by 550 days.

(21) Appl. No.: 11/201,220

(22) Filed: Aug. 10, 2005

(65) Prior Publication Data

US 2006/0061559 A1 Mar. 23, 2006

Related U.S. Application Data

(60) Provisional application No. 60/611,220, filed on Sep. 17, 2004.

(51) Int. Cl.
*G02F 1/00* (2006.01)

(52) U.S. Cl. ....................................... 370/503; 348/503

(58) Field of Classification Search ................. 359/242, 359/290, 298; 382/162; 345/98, 519, 210; 358/1.17; 375/240; 341/79; 370/503
See application file for complete search history.

(56) References Cited

U.S. PATENT DOCUMENTS 4,486,785 A 12/1984 Lasher et al.
4,698,672 A 10/1987 Chen et al.
4,704,628 A 11/1987 Chen et al.
4,816,914 A 3/1989 Ericsson
4,918,689 A 4/1990 Hui
5,018,167 A 5/1991 Perelman
5,159,449 A 10/1992 Almendinger
5,159,453 A 10/1992 Dhein et al.
5,168,375 A 12/1992 Reisch et al.
5,216,529 A 6/1993 Paek et al.
5,228,098 A 7/1993 Crinon et al.
5,260,783 A 11/1993 Dixit
5,283,646 A 2/1994 Bruder
5,289,299 A 2/1994 Paek et al.
5,303,031 A 4/1994 Khoury et al.
5,339,164 A 8/1994 Lim
5,347,310 A 9/1994 Yamada et al.
5,398,066 A 3/1995 Martinez-Uriegas et al.
5,438,440 A 8/1995 Paek et al.

(Continued)

FOREIGN PATENT DOCUMENTS

WO WO 01/54112 A1 7/2001

*Primary Examiner*—Dang T Ton
*Assistant Examiner*—Lionel Preval
(74) *Attorney, Agent, or Firm*—Fish & Richardson P.C.; Kellv Kordzik

(57) ABSTRACT

The encoding and processing of data for many applications can be rendered more tractable when the encoding method can independently manipulate two or more parameters that result, by conjunction, in an accurately posted data value precisely where it is expected. From a data standpoint, this would entail dividing an n-width digital word into separate fractional words and processing the subsets consecutively and independently, where the distinction between these fractional words has an explicit bearing on the information being borne. For example, an 8-bit word can be decomposed into two 4-bit words, half of which are processed while the transmission source is at full intensity, the other half being processed while the transmission source is at $1/16^{th}$ intensity, thereby recovering the entire dynamic range of the original 8-bit word while reducing the bandwidth and cycle speed necessary for the transducer to be driven by the input signal.

15 Claims, 6 Drawing Sheets

U.S. PATENT DOCUMENTS 5,468,069 A 11/1995 Prasanna et al.
5,581,361 A 12/1996 You et al.
5,612,742 A 3/1997 Krause et al.
5,638,533 A 6/1997 Law
5,640,159 A 6/1997 Furlan et al.
5,742,346 A 4/1998 Slevers et al.
5,790,269 A 8/1998 Masaki et al.
5,805,228 A 9/1998 Proctor et al.
5,815,421 A 9/1998 Dugong et al.
5,831,678 A 11/1998 Proctor et al.
5,881,175 A 3/1999 Kim
5,926,205 A 7/1999 Krause et al.
5,926,226 A 7/1999 Proctor et al.
5,943,096 A 8/1999 Choo
5,949,911 A * 9/1999 Chui et al. .................. 382/240
5,995,990 A 11/1999 Henry
5,999,307 A 12/1999 Whitehead et al.
6,005,981 A 12/1999 Ng et al.
6,006,276 A 12/1999 MacCormack et al.
6,018,351 A 1/2000 Mennemeier et al.
6,049,632 A 4/2000 Cockshott et al.
6,064,404 A * 5/2000 Aras et al. .................. 345/530
6,072,830 A 6/2000 Proctor et al.
6,101,299 A 8/2000 Laor
6,125,398 A 9/2000 Mirashrafi et al.
6,128,413 A 10/2000 Benamara
6,160,918 A 12/2000 Pigeon
6,185,253 B1 2/2001 Pauls
6,236,682 B1 5/2001 Ota et al.
6,255,820 B1 7/2001 Steckner
6,277,074 B1 8/2001 Chaturvedi et al.
6,304,714 B1 10/2001 Krause et al.
6,307,663 B1 10/2001 Kowarz ...................... 359/231
6,356,665 B1 3/2002 Lei et al.
6,373,986 B1 4/2002 Fink
6,421,464 B1 7/2002 Tran et al.
6,438,165 B2 8/2002 Normile
6,487,526 B1 11/2002 Mitchell
6,536,043 B1 3/2003 Guedalia
6,542,622 B1 4/2003 Nelson et al.
6,587,507 B1 7/2003 Chvi et al.
6,621,864 B1 9/2003 Choo
6,625,667 B1 9/2003 Westerman
6,754,433 B2 6/2004 Hurley et al.
6,833,832 B2 * 12/2004 Wolverton .................. 345/532
6,844,947 B2 1/2005 Salchi et al.
6,850,352 B1 * 2/2005 Childers ..................... 359/237
6,864,909 B1 3/2005 Horowitz
6,888,893 B2 5/2005 Li et al.
6,888,894 B2 5/2005 Prakash et al.
6,987,889 B1 1/2006 Horowitz
7,016,417 B1 3/2006 Roman et al.
7,035,332 B2 4/2006 He et al.
7,050,503 B2 5/2006 Prakash et al.
7,075,993 B2 7/2006 O'Brien, Jr.
7,082,162 B2 7/2006 Prakash et al.
7,082,166 B2 7/2006 Prakash et al.
7,085,319 B2 8/2006 Prakash et al.
7,088,867 B2 8/2006 Wang et al.
7,103,103 B2 9/2006 Prakash et al.
2004/0120025 A1 6/2004 Lehoty
2005/0094244 A1 * 5/2005 Richards ..................... 359/291

* cited by examiner

ENHANCED BANDWIDTH DATA ENCODING METHOD

PRIORITY BENEFIT AND CROSS REFERENCE TO RELATED APPLICATIONS

This application is related to the following commonly owned U.S. patent applications:

Provisional Application Ser. No. 60/611,220, "Enhanced Bandwidth Data Encoding Method," filed Sep. 17, 2004, and claims the benefit of its earlier filing date under 35 U.S.C. § 119(e).

TECHNICAL FIELD

This invention deals with the encoding and transmission of data, and more particularly with addressing and timing techniques for systems using a multidimensional array of elements that present or transmit information to a user or reading system.

BACKGROUND INFORMATION

Data encoding algorithms find a rich application field in the realm of electronic video displays, particularly with respect to flat panel display systems. While in no way limiting the present invention, or associated prior art, to this application, it is instructive to tabulate the features of such example applications to illustrate how prior art has evolved and been applied. This approach is followed in the discussion immediately following.

The first illustrative example for the application of such encoding algorithms is a direct-view flat panel display system that uses sequentially-pulsed bursts of red, green, and blue colored light emanating from the display surface to create a full color image. The human visual system effectively integrates the pulsed light from a light source to form the perception of a level of light intensity. By making an array of pixels (picture elements on the video display) emit, or transmit, light in a properly pulsed manner, one can create a full-color display. A term commonly used to define this technique is called field sequential color (hereafter, FSC), and U.S. Pat. No. 5,319,491 (Selbrede) entitled "Optical Display," uses this phenomenon as a basis for a flat panel display and is incorporated by reference herein.

The gray scale level generated at each point on the display surface is proportional to the percentage of time the pixel is ON during the primary color subframe time, $t_{color}$. The frame rates at which this occurs are high enough to create the illusion of a continuous stable image, rather than a flickering one. During each primary color's determinate time period, $t_{color}$, one can dictate the shade of that primary color by having its associated pixel open for the appropriate fraction of $t_{color}$. For example, producing 24-bit encoded color requires 256 (0-255) shades defined for each primary color. If one pixel requires a 50% shade of red, then that pixel will be assigned with shade 128 ($128/256=0.5$) and stay on for 50% of $t_{color}$. This form of data encoding assumes a constant magnitude light source to be modulated across the screen. Moreover, it achieves gray scales by evenly subdividing $t_{color}$ into fractional temporal components.

To generalize from this specific video-based application to a wider range of suitable applications, it is appropriate to define terms to be used throughout this disclosure. The individual video pixels, which correspond to array elements from the standpoint of the incoming data, serve to modulate (by on/off gating) the light present within the display screen. The light within the screen (the global quantity to be modulated by gating at each array element) is emitted at a determinate intensity for a determinate duration. This physical effect, of known intensity and duration, shall henceforth be termed a transmission pulse. It is the quantity that will be modulated by the encoding data within the array. The light illuminating the video display, then, is a surrogate for a larger class of quantifiable entities which can be mathematically encoded and controlled using the methods disclosed in this disclosure. Said quantifiable entities symbolized by the term "transmission pulse" may not necessarily be intensities of light energy, as the application range of the encoding method is far broader than the field of video displays.

Other technologies use FSC and pulse width modulation (hereafter, PWM) address schemes to create a projection-based system (as opposed to the direct-view system referenced above). Such a projection-based display is found in the Digital Light Processor™ (DLP) from Texas Instruments, a patented projector system which uses an array of micromirrors as disclosed in the patent for the Digital Micromirror Device™ (DMD) (see U.S. Pat. Nos. 5,278,652 and 5,778,155, respectively). In the DMD, the mirrors are tilted one way to reflect light through a lens in a projection display system and tilted the opposite way to prevent light from reflecting through the projection lens. By timing precisely when and for how long the mirrors are oriented to reflect light, the DMD reflects the correct shade, or brightness, of a either a constant primary light source or a white light source that is filtered through use of a continuously rotating color wheel. The encoding strategy implemented in these Texas Instruments devices divides the cycle time into unequal fractions, as opposed to the equal duration time slice strategy disclosed for the direct-view device in Selbrede. The unequal fractional durations are temporally proportioned as ascending powers of two (e.g., the second fraction is twice the length of the first; the third fraction is twice the length of the second, up to the largest fraction contemplated).

SUMMARY

The present invention codifies a method of encoding data for applications such as, but not limited to, video display systems. Its utility is most obvious for video systems that, for example, incorporate methods for pulse width modulating frames of video data to control both input (illumination) light sources and the individual pixels comprising a spatial light modulator (SLM) composed of an array of pixel elements that are addressable in a row by row, and/or subarray by subarray, fashion. This encoding method can also apply to an array of SLM pixels where the state of each pixel may or may not be controlled by unique transistors or other active switching devices. The pixels in the array are addressed in a subarray by subarray fashion for turning ON the pixels (i.e. transmitting, reflecting, or emitting light). These subarrays may consist of one row, some number of rows, or all rows of the array. The entire array, or subarray of several rows, of pixels can also be simultaneously set to the same state (ON or OFF) during a screen refresh or reset. During the addressing of the array of pixels, the light sources used to transmit light through the pixels are controlled independently.

The present invention would enhance the encoding of information being directed toward a system lending itself to such enhancement, such as, for example, a video display device composed of optical shutters that use frustrated total internal reflection (TIR) to create a transmissive display that produces color by the method of FSC. The example display system referenced earlier (Selbrede) is known as the Time Multiplexed Optical Shutter (TMOS). However, the present invention can also apply to other display architectures, such as those incorporating pulsed light sources and optical transmissive or reflective elements, or pixels, whose light properties originate from said pulsed light sources. The domain of applicability for the present invention extends far beyond video display devices, which are used herein for illustrative purposes.

The present invention is particularly well suited to application within the TMOS example already described, since TMOS, within its utility range, uses a one-part per pixel architecture whereby the full color spectrum is transmitted through each pixel. Many display systems use a three part pixel (i.e. red, green, and blue regions comprising subpixels that are spatially distinct one from another) which combine in some proportion to produce the desired color when viewed far from the screen. The light sources, or lamps, that serve to illuminate the TMOS system are controlled independently of the on-screen pixels, which are actuated as required based on program content. Consonant with the definition proposed at the outset, the sequential activation of the primary color light sources that illuminate the TMOS display constitute an example of "transmission pulse" events. The transmission pulse is spatially modulated by the controllable array of pixels that permit or forbid coupling of the light out of the display for propagation to the observer, who, over time and pursuant to the principles of FSC, perceives a color video image on the display surface.

Most encoding mechanisms for FSC-based systems presuppose some form of bistable, memory, or persistence effect, such as that disclosed, as one possible example among many, in the patent filing "Simple Matrix Addressing" (Derichs) which is hereby incorporated by reference in its entirety. This memory effect may or may not result from individual, and/or discrete, memory elements, such as CMOS memory cells or transistors. For example, one embodiment of TMOS posits that each pixel is a microelectromechanical system (MEMS) variable capacitor configured so that the separation between conductors in each pixel's air gap can be reduced during actuation from a default unactuated state during which no voltage or charge is applied to the pixel. In said example, applying a voltage across the capacitor forces the upper electrode to approach the lower electrode through Coulomb attraction, thereby reducing the air gap distance while increasing the pixel's capacitance. In this example, when a sufficient voltage, $V_1$, is applied, the moving upper conductor layer will contract to come into contact with the lower conductor layer (unless they are separated by some solid dielectric) in an effect known as the pull-in or snap-down. To release the contact between the two conductors (or their respective dielectrics) the capacitor voltage needs to reach a second voltage, $V_2$, that is less than $V_1$. All nonaddressed rows stay within the voltage range $V_2<V<V_1$. Thus, an addressed row of pixels can be actuated without changing the state of the pixels (or capacitors) in the nonaddressed rows. This control method takes advantage of the hysteretic nature of the pixels being variable capacitors. The present invention is both compatible with and suitable for application to this particular device.

The present data encoding invention is also applicable for other control methods that, for example, can alter the discharge rate of a row of pixel capacitors from high (when addressing that row) to low (when not addressing that row). Where suitable preconditions for applicability are met, the present invention provides significant utility in optimizing the encoding of data.

The foregoing has outlined rather broadly the features and technical advantages of one or more embodiments of the present invention in order that the detailed description of embodiments of the present invention that follows may be better understood. Additional features and advantages of embodiments of the present invention will be described hereinafter which form the subject of the claims.

BRIEF DESCRIPTION OF THE DRAWINGS

A better understanding of the present invention can be obtained when the following detailed description is considered in conjunction with the following drawings, in which.

DETAILED DESCRIPTION

Figure 1:
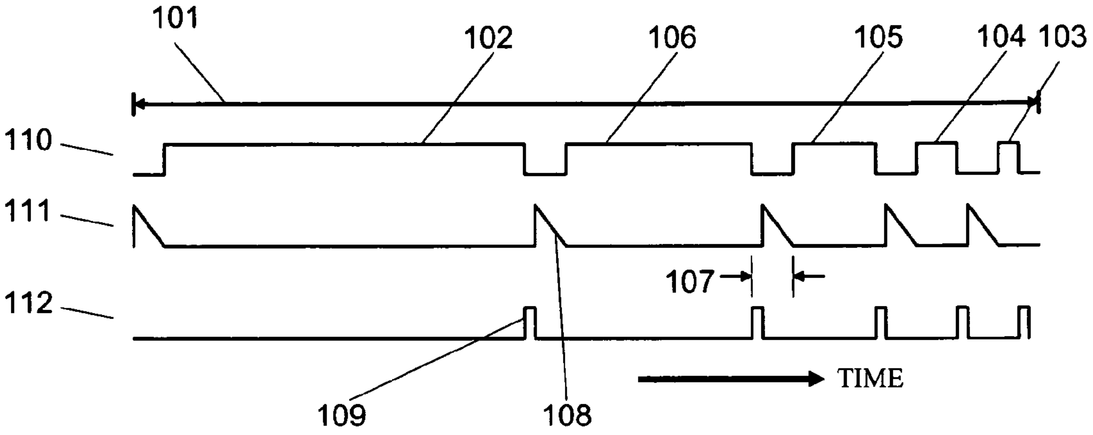
FIG. 1 illustrates an example of using the present invention in a display application, shows a timing chart for a primary color subframe of a 5-bit color per primary binary weighted FSC color scheme.

The present invention is a method of encoding data associated with an arbitrarily-sized array of elements the content of which may vary in value, of any dimension, where the data is allowed to be presented in different ways and at different times relative to when the data is loaded. The array elements can present multiple discrete states, two for binary, three for ternary, four for quaternary, and so on. The input data stream to be loaded to the array of elements generally contains more information than can be presented, stored, or transduced, by the array at any one instant in time. Therefore, data subsets can be used in temporal succession to present the full information set to the user. Either each individual data subset presented in the array or the subsequent temporal succession of data subsets presented in the elemental array then provides the complete information content of the input data stream within the application-specific device in question. The time during which each subset of information is sequentially presented in the array lasts for some determinate duration called the subset time. Each subset of data is normally expected to fill the array and can be further decomposed into subarrays that may be loaded and presented at different times. In some video applications, the data being transferred reflects only change in information content, such that the entire array is not necessarily reloaded during each subset time. The present invention applies to any such variation as well as the expected core utility. It is noted that the principles of the present invention are not to be limited to the field of video display devices. It is further noted that a person of ordinary skill in the art would be capable of applying such principles to other applications.

One possible application of the present invention is the transmission of a frame of visual information by use of FSC in a video display system consisting of a two-dimensional array of pixels. In this real-world example, a frame is a set of information that determines the color and brightness of each pixel comprising the video display being observed by the viewer. The frame is composed of multiple data subsets, or subframes, usually dictated by the number of primary colors to be mixed to create the desired output (in this example, the three so-called tristimulus colors—red, green, and blue—are the most commonly used primary colors). The full-color information, then, is parsed into separate channels of data for each primary color. Each subframe will then encode different shades associated with the appropriate primary color which is a fraction of the primary full intensity. These shades (which, in this data, are fractions of an irreducible and discrete primary color) represent the lowest subset of data for the display. Using FSC techniques, a desired shade can be displayed by selectively restricting the emission time of the primary color at a given pixel (array element) for a determinate fraction of time, the subset time, that is temporally proportional to its primary color shade value. The total time allowed for every full-color video frame is $t_{frame}$=1/(frames per second). In one embodiment, the time allowed for every constituent primary color is $t_{color}=t_{frame}/N_{color}$, (101 of FIG. 1), where $N_{color}$ represents the number of primary colors (generally set to 3 primaries for most video applications, but not limited to 3, nor, for that matter, limited to primary colors). For 60 fps and $N_{color}=3$ for red, green, and blue primary lamps, time $t_{color}$=5.56 msec.

FIG. 1 shows a representative example of a binary shade and timing sequence for a display application that deploys the present invention with 5-bit information per primary color subframe 101, where generically 101 represents a data subset time. This sequence would be repeated for each primary color comprising the FSC encoding scheme. The light source of the display is a specific implementation of a general transduction method applied to the elemental array. That is to say, when the lights are on, the user can see the information content of the encoded image on the display surface, and when they are off, the user cannot see, or read, the information (since no light is being emitted from the display surface). FIG. 1 shows that the transmission pulse 110 is on at five different periods corresponding to the five bits of information and the corresponding five subsets. The most significant bit (hereafter MSB) 102 is the longest in time, and the least significant bit (hereafter LSB) 103 is the shortest in time. The LSB 103 lasts for $\frac{1}{2}^{n-1}$ of the total time light is emitted, where n is the number of bits. The second least significant bit 104 lasts for 2 times the duration of the LSB 103, the third least significant bit 105 lasts for 4 times the duration of the LSB 103, the fourth least significant bit 106 lasts for 8 times the duration of the LSB 103, and the fifth least significant bit, or MSB 102, lasts for 16 times the duration of the LSB 103. Note again that the example provided is for illustrative purposes and is not intended to limit the scope of applicability or utility of the present invention.

A data subset of information presented in the element array takes some non-zero array time 107 to be loaded and stored 108 and some non-zero time to be unloaded and cleared 109 from the array due to the temporal constraints of the array elements themselves and intrinsic latency of the other physical components comprising the system in question. The data can be loaded and cleared for all elements simultaneously or incrementally by handling a subarray of elements (such as one row of a two-dimensional array) at a time. The data is visually presented to the user independently of the loading pulse sequence 111 and the unloading or clearing 112 pulse sequence as dictated in time and duration by the transmission pulse 110, which is unmodulated (full intensity) for the example disclosed at this point. The data can either be presented as the data is loaded 111 and cleared 112, or after all data loading of the array has been completed.

For a sample display application using FSC, the transmission pulses 110 indicate when the light sources are on. In FIG. 1, the data loading pulse sequence 111 composed of the pulses 108 represents when the display pixels are actuated to ON, and the data clearing pulses 109 are triggered by the clearing pulse sequence 112 to turn the pixels OFF. Note that it is possible for the pulses 108 to trigger state changes among the general array elements (ON, OFF, or others) provided there is enough time available to do so. Thus, in the display application example provided, the pulse sequence 111 can be composed of pulses that turn some pixels ON and then some pixels OFF, or vice versa.

Figure 2:
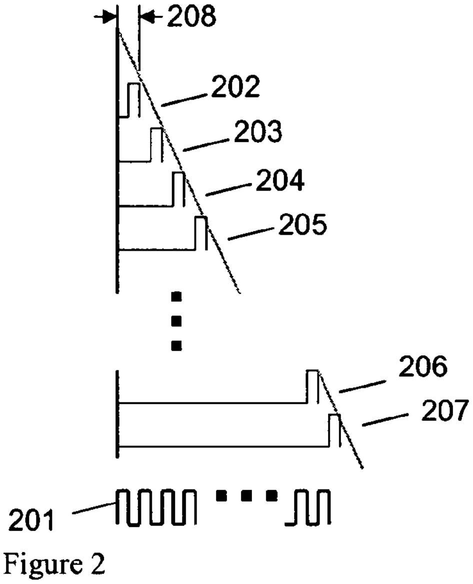
FIG. 2 illustrates an example of using the present invention in a display application, showing that the time required for sequentially addressing an array of elements row by row is composed of the times for loading the data and then pulsing the rows for a time required to activate the pixels in the addressed row.

FIG. 2 depicts a more detailed breakdown of the data loading pulses 108 to show one possible method to load data to the array elements in a subarray by subarray fashion. The present invention allows for loading data for subarrays in one dimension (e.g. a row) or multiple dimensions (e.g. rows and columns) of the array at a time. The data loading pulses 201 occur before each element subarray is activated, and they are often temporarily stored, for example, in shift registers. When a pulse 201 is finished for the first elemental subarray, the data is shifted to the first subarray 202 by pulses 201. To load the data for the entire element array, the loading of data is continued by pulses 201 for data subarray two 203, data subarray three 204, data subarray four 205 and continuing for all 'm' data subarrays until data subarray 'm-1' 206 and finally data subarray 'm' 207 are handled. Each loading and shifting of the data takes a subarray time 208 to be completed for that subarray. Thus, the total elapsed time to shift all data in a subset of information is m times the subarray time 208 for the example of equal duration for addressing each subarray.

Depending upon the control scheme underlying the element array, during a single addressing event for a given subarray the elements can (1) only be turned to some level ON state, (2) only be turned to the OFF, or (3) turned both to the proper ON state and OFF state before addressing the next subarray. Each of these three possibilities dictates a different bandwidth requirement to properly handle the input data. It is noted that the discussion below is for an embodiment in which the pixel elements are binary. However, the principles of the present invention may be applied to pixel elements that are ternary.

The maximum clock speed in each encoding scheme is calculated as $N_{cycles}$/(array time 107) where $N_{cycles}$ is the number of clock cycles per array address. $N_{cycles}$ is equal to $N_{elements}$/(input bits per clock cycle.) where $N_{elements}$ is the number of elements in the array. Consider the application of the present invention to a representative video display composed of $N_{row}$ number of rows and $N_{col}$ number of columns of pixels. If $N_{col}$=1024 and $N_{row}$=768, then $N_{elments}$=$N_{row}N_{col}$. If the data is input at 32 input bits per clock cycle, then these parameters produce $N_{elements}$=24,576. The clock speed required for this FSC display application is roughly determined by the array time 107 allowed to address the display (assuming row by row addressing). For example, if the array time 107 is equal to 300 μsec, the maximum required clock speed is approximately $N_{cycles}$/(array time 107)=82 MHz. The peak bandwidth (BW) is related to the clock speed as BW=(bits per clock cycle)(max. clock speed). For the current example with 32 bits per cycle, the peak BW is 2.6 Gbit/sec. The utility inherent in the present invention is that it minimizes bandwidth by maximizing the array time 107 and/or making it suitably variable.

Equal Time Encoding

The conceptually simplest (but far from most bandwidth-efficient) encoding scheme would specify that each subset time be of equal duration. If each subarray is of equal size, then the subarray times are also equal. In this case, the array time 311 can be solved as array time 311= data set time 310/$N_{subset}$ where $N_{subset}$ is the number of subsets and 310 is the data set time. The corresponding subarray time (208 of FIG. 2) in this case is calculated to be the array time 311/$N_{subarray}$, where $N_{subarray}$ is the number of subarrays per subset.

Figure 3:
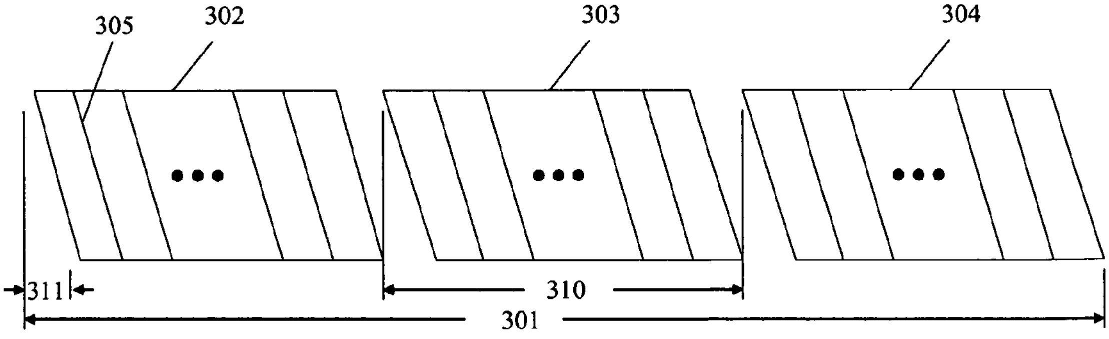
FIG. 3 illustrates an example of using the present invention in a display application, showing a timing chart and defining relevant terms for addressing a pixel array using FSC where each subframe used to generate shades of color is of equal time duration.

FIG. 3 shows a schematic for the equal time subframe FSC application for a display where the time required to move along the slope of the parallelograms is the array time 107 to address all pixels of a two-dimensional row by column array. The part of the parallelograms that is nonshaded (in this case the entire part of each parallelogram) indicates the time at which the transmission pulse is ON. For example, to create 6-bit color per primary the number of subsets 305 per primary color is equal to 65 (i.e.. $2^6$=64 corresponding to a range of values 0 to 63, thus the number of subsets =64+1, wherein the 1 refers to accessing the array to turn all pixels OFF). Therefore, assuming in this example three primary color lights 302, 303, and 304 sequentially providing three separate transmission pulses, there are 65*3=195 total subsets 305 in this application that fit within the frame time 301. One suitable approach to handling equal time encoding for a FSC display would be to turn all pixels ON only once during each primary color time (i.e., data set time 310) at the appropriate point within the subset to achieve the desired shade. Then during the last addressing of the array at the end of 310, every pixel will be turned OFF when its subarray is addressed. This corresponds to an articulated individual ON point and a common synchronous OFF point. The opposite approach is also quite feasible. wherein every pixel with non-zero data content is initially turned ON, with each pixel being individually turned OFF at the appropriate time during each primary color time or data set time 310. In this last instance, a common synchronous ON point is juxtaposed with an articulated individual OFF point.

Using for illustrative purposes a video display application for deploying the present invention, consider that for an equal time FSC display application (60 fps, $N_{color}$=3), array time 311 is equal to each primary color time or data set time 310 (i.e., fps/$N_{color}$=60/3) divided by 65 (where 65 is based on 6-bit color ($2^6$) plus 1) which equals 85 μsec, and with $N_{row}$=$N_{subarray}$=768 the subarray time is 111 nsec. In such an embodiment, the time to address the array 311 is the same as the LSB time (by definition) so that the amount of time that the transmission pulse (e.g. light source) is on for the first row is the same as for the last row. This is the reason there are 65 subsets 305 within each primary color time or data set time 310 instead of 64, as it assures the color shade generated by pixels in the top (first) row is the same as from those in the bottom (last) row. During the subarray time one is able to turn all desired pixels in a subarray either ON or OFF. The main clock speed required for this equal subset time FSC embodiment ($N_{row}$=768, $N_{col}$=1024) is 289 MHZ. corresponding to a peak bandwidth of 9.2 Gbit/s for a 32 bit-deep input to each subarray.

1. Full Binary Encoding

Figure 4:
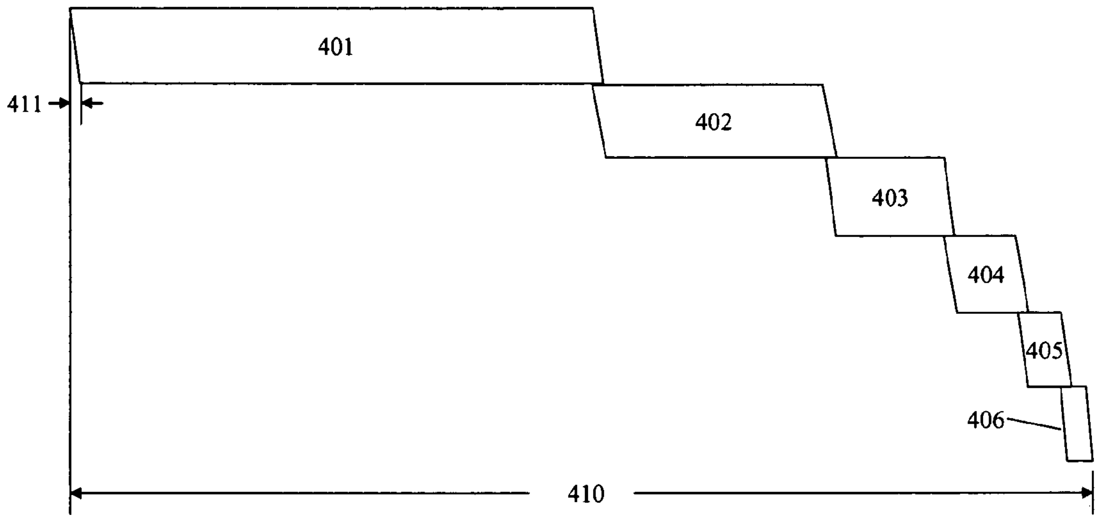
FIG. 4 illustrates an example deployment of the present invention in a display application, showing a 6-bit per primary binary FSC encoding method.

FIG. 4 depicts the timing sequence for implementing a binary encoding scheme using 6-bits as an example. The advantage of this method is that it decreases the bandwidth required to implement the equal time encoding scheme by reducing the number of times the array is addressed during the data subset time 410. The binary encoding scheme only addresses the array at the edges of the parallelograms shown in FIG. 4. The part of the parallelograms that is nonshaded (in this case the entire part of each parallelogram) indicates the time at which the transmission pulse is ON. The MSB 401 is shown on the left with the lower significance bits, 402, 403, 404, and 405 cascading to the right toward the LSB 406. The slope of the parallelograms implicitly reflects the time allowed to address the array, 411, which in this case is equal to the time of the LSB 406.

Instead of turning ON an element once and waiting until the end of 410 to turn it OFF, as in the equal subframe time encoding method, the binary encoding method requires the ability to switch an element between ON and OFF states during any of the bits of FIG. 4. In other words, discontiguous pixel state changes during data set time 410 are a precondition for binary encoding. That is, discontiguous pixel state changes during, among, or between each transmission pulse are a precondition for binary encoding. For instance, if an element has a value 20, then it is ON during bits 402 (with value of 16) and 404 (value 4) but OFF during bits 401, 403, 405, and 406 with values 32, 8, 2, and 1, respectively. Presenting data in this binary, and potentially discontiguous, manner, necessitates an architecture capable of activating and deactivating an element during each time period 411 that a subarray is addressed.

In this FSC video display application example, the time periods 401 through 406 for which a pixel is ON represents the shade of a primary color that is displayed to the viewer. A pixel designated with bit value 20 would have 20/63 the full brightness possible, for a pixel having a maximum color shade of 63, and would only be ON during the subframes 402 and 404 of FIG. 4. To compare these results to the preceding equal subframe time FSC example, consider that this binary FSC encoding scheme will have array time 411 equal to each primary color time (i.e., data set time 410) divided by 65 which equals 85 μsec, and the subarray time is 111 nsec—values that match those for the equal time subframe FSC method since there are also 65 equal array address times 411. In fact, the required pixel response in this case is more stringent than for the equal time subframe FSC because now pixels are turned ON and OFF (not just on or off) during the subarray time.

For the binary encoding scheme the array is not addressed at regular intervals because of the binary-proportioned periods of time between array addresses. Although the array is addressed fewer times than in the equal subset time method, it is addressed at the same speed because they nonetheless have the same array access time, 411 in FIG. 4 and 311 in FIG. 3, respectively. Therefore, the main clock speed for this example remains 289 MHz.

Dual Binary Encoding (With Reduced LSB Transmission Intensity)

Figure 5:
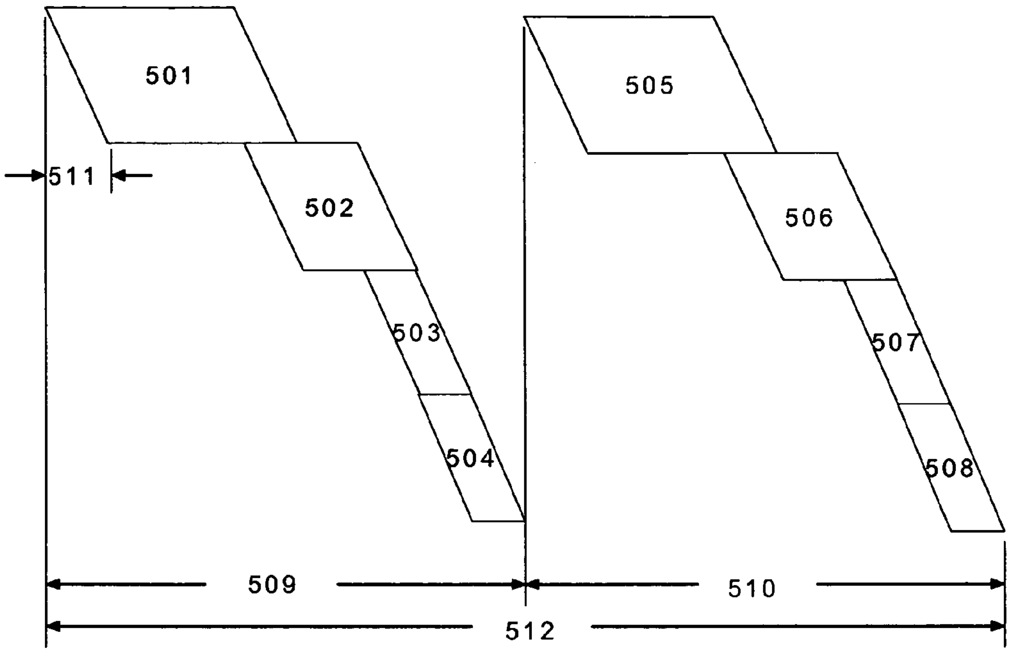
FIG. 5 illustrates a 6-bit per primary dual binary encoding method that includes transmission pulse intensity control in accordance with an embodiment of the present invention.

The dual binary encoding is designed to improve both the bandwidth and element timing requirements in systems such as those used as illustrative examples throughout this disclosure. A representative schematic of the dual binary encoding method, as applied to a video display system with transmission pulse intensity control, is shown in FIG. 5 for 6-bit data depth using three primary colors. During time 509 the transmission of data to the user is at a (presumed) maximum intensity level, and during time 510, the transmission of data to the user is at a lower intensity level governed by the number of bits being stored in the array. 510 and 509 therefore represent two consecutive phases in the generation of data values, distinguished primarily by the differing intensities of the transmission pulse (represented here in this example by the light sources illuminating the video display). The most significant bits, 501 through 503, are generated during 509, and the least significant bits, 505 through 507, are generated during 510. The time periods 504 and 508 each serve to clear the entire array of data as a precondition for shifting between the two phases of data encoding, from MSB generation to LSB generation, or vice versa. MSB generation occurs while the transmission pulse intensity is high, while LSB generation occurs while the transmission pulse intensity has changed state to a lower predetermined value. If the data is not cleared between phases in this manner, the transmission of the data will be corrupted because of temporal crosstalk generated by the intrinsic intensity level difference between the two sequential phases. The intensity of transmission of the data is $\frac{1}{2}^{n/2}$ where n is the number of bits being presented in the data. In the example illustrated that arbitrarily uses a 6-bit data depth in FIG. 5, the second phase intensity level (during 510) is ⅛ of the full intensity level unique to the first phase (during 509).

Were this dual binary encoding to be deployed in the same video application used to previously illustrate the full binary encoding system, the comparative values for the key parameters, wherein 512 is the data set time and 511 is the array time, are the data set time 512 equal to 18 times the array time 511, such that the array time 511 equals 309 μsec and the subarray time is 402 nsec. These values represent a highly desirable order of magnitude increase in time available to address the pixels in a row of the display as compared to the previously-described full binary and equal time encoding methods. By slowing down the speed at which the screen is addressed, the dual binary encoding method incorporating transmission intensity control reduces the main clock speed to 79 MHz and the peak bit rate to 2.5 Gbit/s. This is an order of magnitude reduction in clocking speed.

The tradeoff for achieving slower addressing times and reduced bandwidth requirements is a lower aggregate absolute transmission magnitude (i.e., the sum of intensities during 509 and 510 is less than twice the value of 509, which latter value prevails in the full binary and equal time encoding methods). The addressing can now be slower for the LSBs because of the partitioning of data between 509 and 510, thereby implementing a dual binary address where two binary encoding schemes share the load. Using FIG. 5 as a guide, each binary scheme during 509 and 510 uses the same internal timing subdivisions between their complementary members. In other words, the duration of 501 equals that of 505, the duration of 502 equals that of 506, and the durations of 503, 504, 507, and 508 are all equal to the time used to address the element array one time. In correspondence with these equalities, the duration of 601 equals that of 605, the duration of 602 equals that of 606, and the durations of 603, 604, 607, and 608 are all equal to each other and to the array access time 620. The time periods for loading data and addressing the array are dictated by the data pulse train 612.

Figure 6:
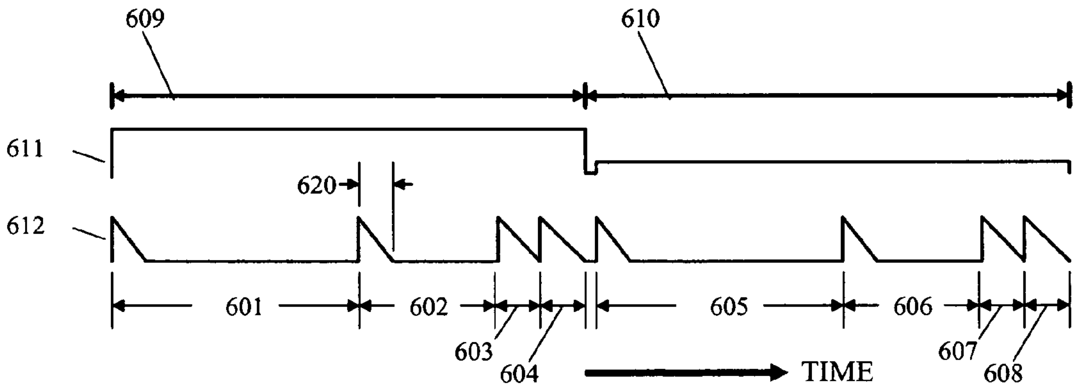
FIG. 6 illustrates an example timing pulse chart for the dual binary encoding method to encode 6-bit data in accordance with an embodiment of the present invention.

The difference between the dual binary encoding and single binary encoding (consult FIG. 6) is that the transmission pulse 611 is not at full intensity at all times. For half of the data subset time (i.e. during time period 610) the transmission intensity is on for $\frac{1}{2}^{n/2}$ of full intensity which is the targeted transmission intensity during 609. To illustrate the ramifications of this in a representative sample application, consider a video display application that uses a given number of light sources. For such a system, at the bit-depths suggested in the illustrative examples provided, dual binary encoding entails an absolute output intensity of 56% compared to a screen where the lamps are on full intensity at all times. In other words, for a FSC screen with 6-bit color per primary, a pixel with maximum color (shade 63) will produce 56% of the brightness using this dual binary FSC scheme (with reduced light intensity during 610) as compared to using the respective equal time or pure binary encoding methods for FSC. Since the power to drive the system is also reduced by 56%, the net power efficiency of the system is unaffected.

Figure 7:
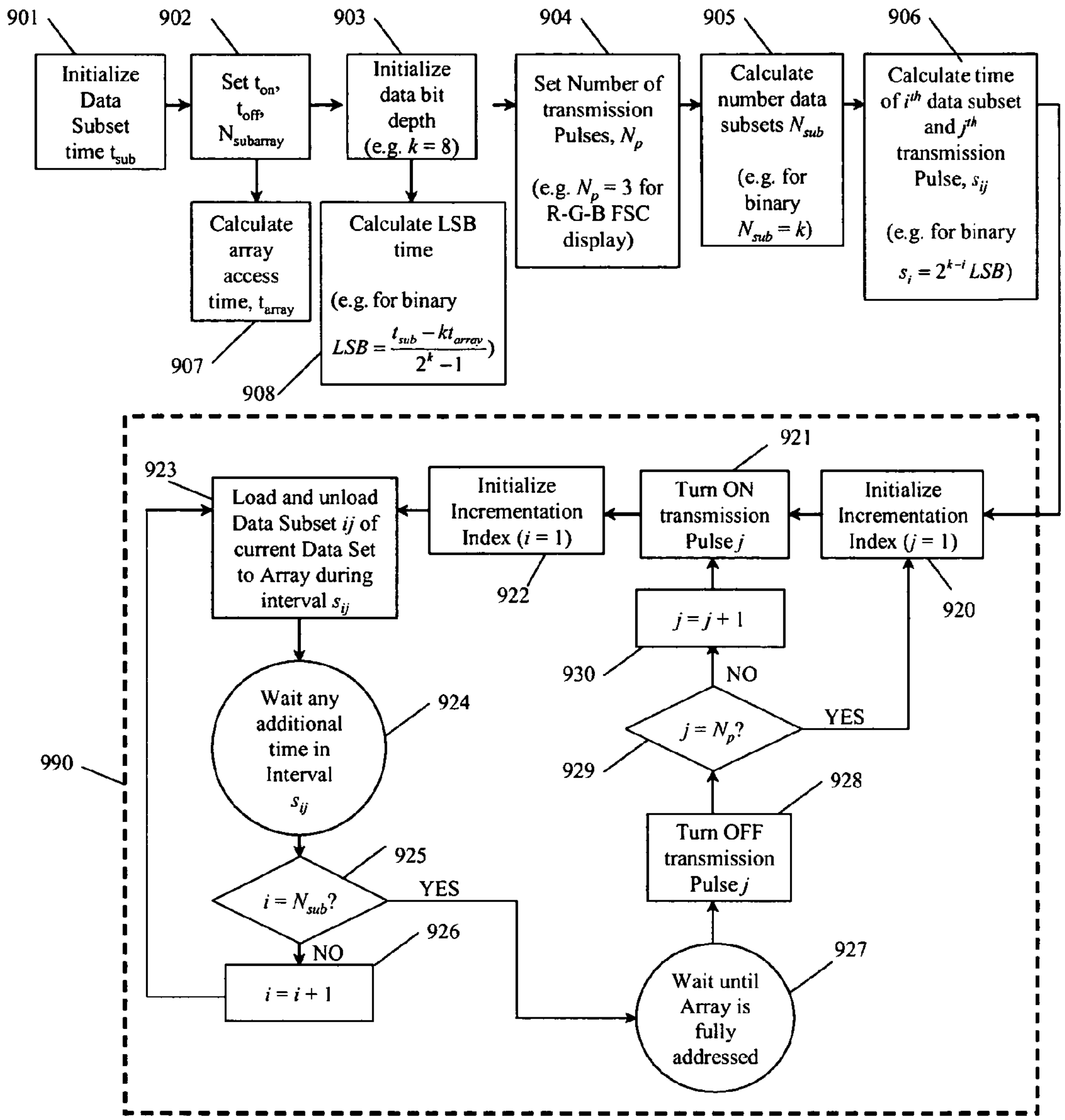
FIG. 7 illustrates an algorithm for a data encoding scheme where the transmission pulse is ON while the data is loaded into and unloaded from the array in accordance with an embodiment of the present invention.

FIG. 7 depicts an algorithm for addressing an array when data is loaded into and/or unloaded from the array while the transmission pulse is ON. FIG. 7 also holds for any encoding scheme, or part of an encoding scheme, such as the non-PWM part of FIG. 8. A block-by-block explication of FIG. 7's timing algorithm breaks down as follows. First, the initial array parameters are set up pursuant to the constraints of the data stream. Block 901 specifies that the data subset time $t_{sub}$ be determined. With $t_{sub}$ known, it is possible to calculate how long it takes to address the subarrays, shown by 902, such that the array address time $t_{array}$ can be calculated for 907. Initializing the data subset bit depth, k, in 903 allows the calculation of the LSB in 908. Block 904 specifies the number of transmission pulses, $N_p$, which would be 3 for the video display examples hitherto used that implement a red-green-blue FSC regime. The number of data subsets, $N_{sub}$, is set in 905, which is equal to the subset bit depth in a binary encoding scheme. Specification of boxes 901 through 905, 907, and 908 permits calculation of the length of each transmission pulse, $s_{ij}$, in 906. When that point is reached, the precalculations are complete. It is then possible to encode the data and address the array as depicted by the looping branch of the algorithm 990.

The incrementation index j is initialized 920 for the transmission pulses. The $j^{th}$ transmission pulse is turned on 921 and the incrementation index i is initialized 922 before loading and unloading the data to the array 923. Depending upon how long it takes to load and unload the data, some additional time may be spent processing the current data subset 924 before loading the next subset. Until all data subsets have been processed 925 the data subsets are incremented 926 and steps 923 and 924 are repeated. Once all data subsets have been addressed and transmitted, the system is tested for completion by determining whether or not the last subarray is finished with its data loading and/or unloading 927 before turning off the current transmission pulse 928. Until all data subsets $N_p$ for the current transmission pulse have been processed 929, the steps 921-929 are repeated for each transmission pulse, and the next transmission pulse is turned ON 930.

When the last transmission pulse has been turned OFF, the next data subset 920 is ready to be processed.

Binary Encoding With PWM LSB Transmission Pulse Control

Figure 8:
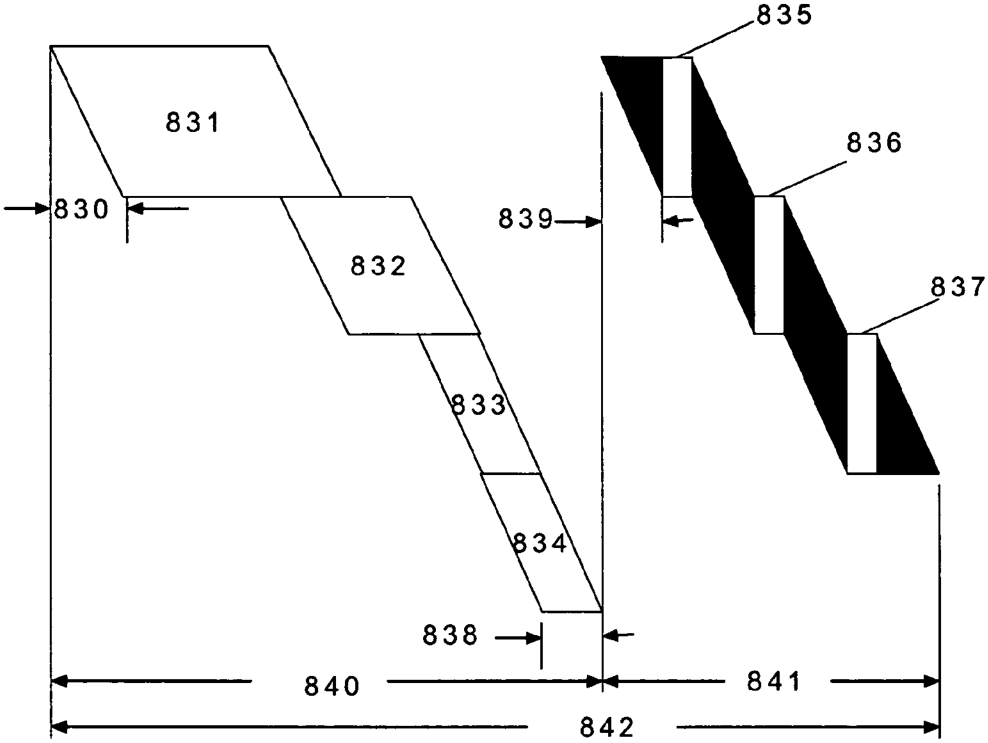
FIG. 8 illustrates an example of the present invention being deployed in a display application, showing a schematic of a 6-bit per primary hybrid binary FSC encoding method that uses PWM lamp control at full intensity.

FIG. 8 shows a schematic that depicts one embodiment of a binary encoding method with PWM transmission pulse control for the three least significant bits (LSBs). PWM as applied to the transmission pulse means adjusting its aggregate intensity by digital means (rapid cycling of the pulse between properly proportioned on and off states) rather than analog means (e.g., reducing the power producing the pulse, thereby reducing its intensity). Note that this encoding scheme can use PWM transmission pulse control for any number of the LSBs (e.g., one or four), not necessarily three or half of the total bits. This digitally-rooted method is an improvement over the usual analog approach to dual binary encoding method with transmission pulse intensity control. Each time period during which the array is addressed fills the same amount of time, $t_{array}$, equal to the LSB time. Here $t_{array}$ is handled under the same assumption undergirding the full binary method: during the subarray time the elements in the addressed subarray have the capability to be both turned OFF and ON. The MSBs in FIG. 8 are 831, 832, and 833, where 834 is used to clear the array. Times 833, 834, 838, and 839 are equal to the subarray access time, 830. The LSBs in FIG. 8 are designated by 835, 836, and 837, and their ratios are exactly in accordance with a binary ratio scheme with respect to both the MSBs and themselves. The total time 841 spent processing the LSBs is governed by Equation (1) where $N_{LSB}$ is the number of LSBs in time 841. All other bits are transmitted and/or processed during 840.

$$841 = t_{array} \cdot \left( N_{LSB} + \sum_{i=1}^{N_{LSB}} \frac{1}{2^i} \right) \qquad \text{(Equation 1)}$$

The reason for treating the LSBs and MSBs differently is that the array address time 830 takes longer than the span of the LSBs. Thus, the transmission pulse can be OFF while the array is addressed for the LSBs and the user (in this illustrative example) will not see the data for too long. When the array has been fully addressed, then the transmission pulse is pulsed ON for the correct time and then pulsed OFF at the appropriate time.

For the 6-bit data encoding embodiment shown in FIG. 8, the binary encoding method with PWM transmission pulse control has array address time determined by data set time 842 equal to 14 times the array time 830, making the array time 830 equal to 397 μsec (using same screen parameters as in equal time encoding example). With $N_{rows}$=768 the subarray time is 517 nsec. The subarray access time has increased slightly from the previous dual binary encoding method with transmission pulse intensity control scheme. The pulsing of the transmission to OFF is represented by the dark areas of the parallelograms of FIG. 8 whereas the white areas represent when the transmission pulse is ON. Using PWM transmission control for the LSBs with the dual binary scheme reduces the required clock speed to 61 MHz and the corresponding bit rate to 2.0 Gbit/s for the illustrative example provided.

In a display application, for the scheme depicted in FIG. 8 the consequence of using this binary PWM encoding scheme for FSC can be readily appreciated: the light sources are OFF for a duration measuring approximately 4 times the array time 830 which equals 4 times the LSB time, or approximately 29% of the time. Thus, the absolute optical output intensity of a display driven using this encoding scheme is 71% that of the outputs achieved where the transmission pulse remains unmodulated (stays at full intensity for both MSBs and LSBs).

Full PWM Binary Encoding

Figure 9:
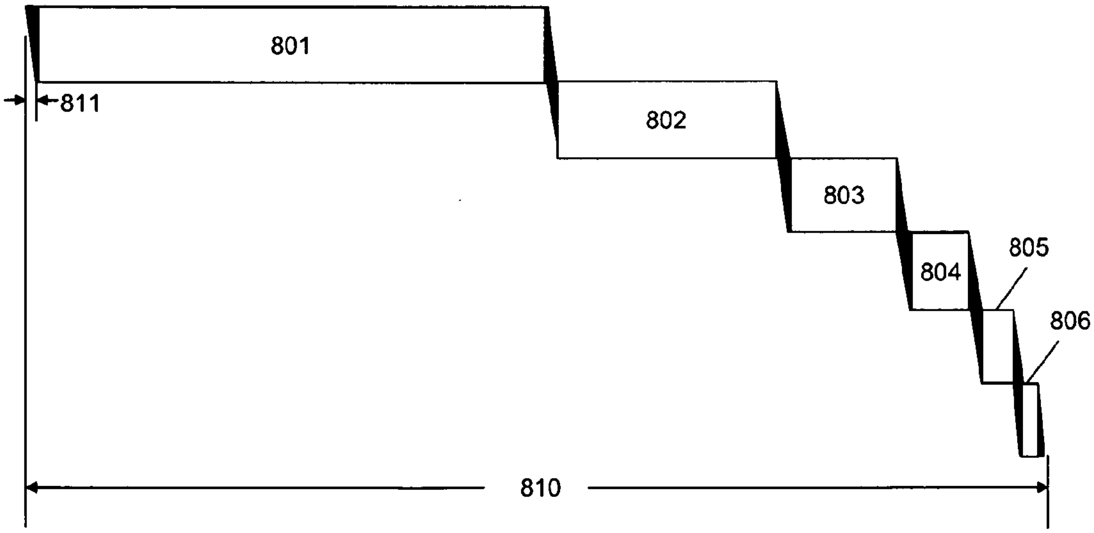
FIG. 9 illustrates an example of the present invention as deployed in a display application, showing an example schematic of the present invention deployed in a system using a 6-bit per primary binary FSC scheme with screen clear and PWM lamp control.

The full PWM binary encoding method is shown in FIG. 9 for a 6-bit encoding embodiment. Here, the array elements are only actuated (subjected to selectively controllable state change) when the transmission pulse is OFF. In FIG. 9 the transmission pulse is OFF for a time 811 at the beginning and end of each weighted bit, 801, 802, 803, 804, 805, and 806. The transmission pulse OFF state is depicted by the dark sections at the end of each parallelogram in FIG. 9. The MSB is 801, and the LSB is 806. The data subset time is 810. Because the transmission pulse is OFF when the elements are actuating and deactuating, the elements can move in a manner that is the fastest while having no data artifacts. (Such artifacts arise from measurable output from the array when no output should be generated by it.) The array control circuitry can be designed such that a single pulse can set every output to the same value (e.g. a 1 or 0). Therefore, an example embodiment might send the same signal to the entire array such that every element is reset to OFF in a minimal number of clock cycles during a determinate portion of 811.

In using this PWM binary encoding scheme, the two fundamental time periods, 107 and LSB 806, are not equal. Time 811 is the array access time, meaning it is the time required to address the array one time, actuating elements ON and OFF, including any array reset time. Designate the LSB 806 as the fundamental time unit that governs the weighting of the binary lamp pulses. In all other encoding schemes described before, there was no need to distinguish among the two different timings since they were inherently equal. Depending upon the constraints imposed upon the encoding scheme, 811 can be less than or greater than 806.

Figure 10:
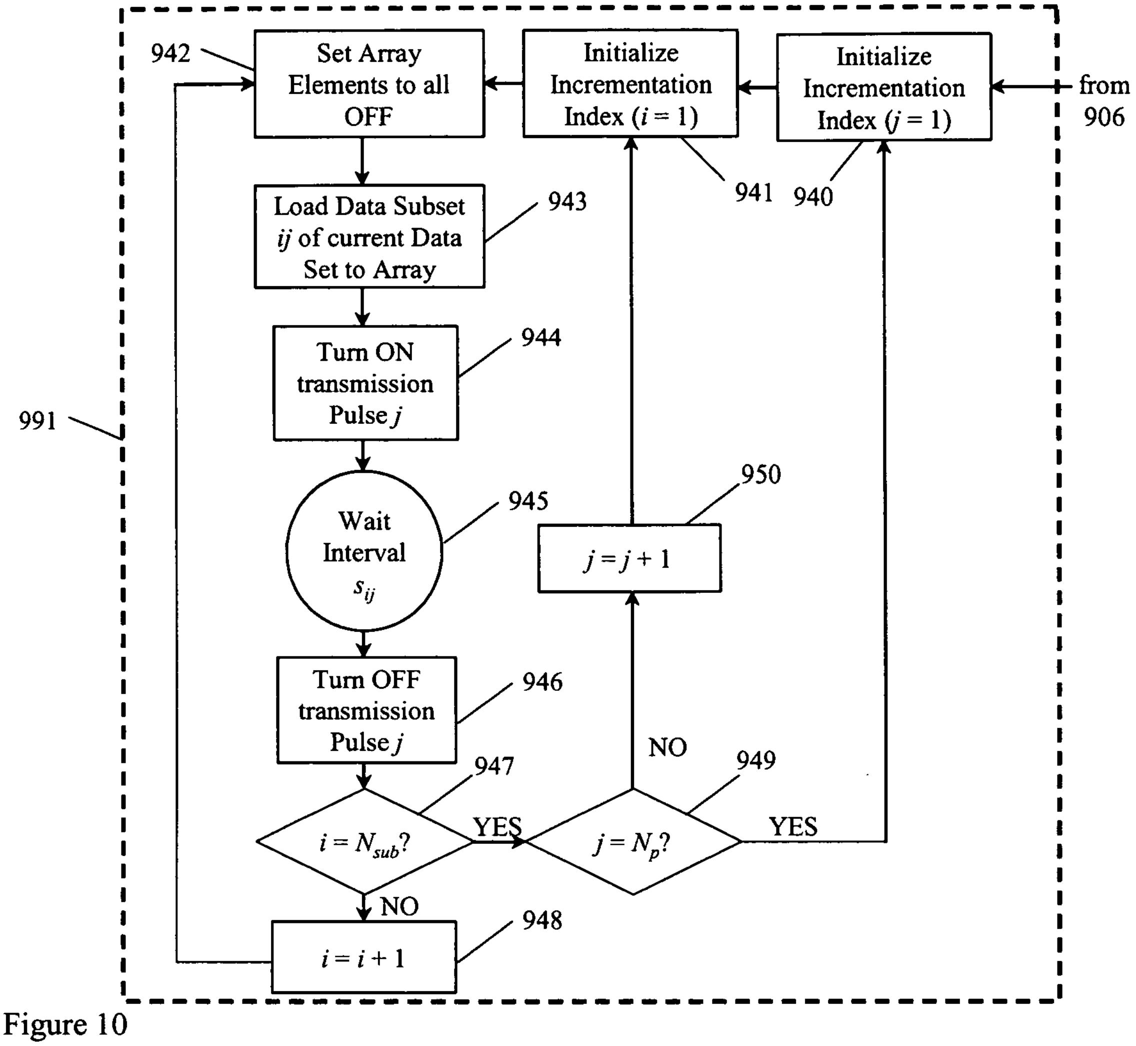
FIG. 10 illustrates an algorithm for a data encoding scheme where the transmission pulse is OFF while the data is loaded into and unloaded from the array in accordance with an embodiment of the present invention.

FIG. 10 illustrates one algorithm for addressing the array using the full PWM encoding, whether the data is input in a binary manner or not. FIG. 10 also holds for any encoding scheme, or part of an encoding scheme such as the PWM part of FIG. 8, where the data is loaded into the array when the transmission pulse is OFF.

The algorithm for implementing an encoding scheme as in FIG. 9 is shown by 991 in FIG. 10 which replaces 990 of FIG. 7. All information from precalculations up to 906 are used as input for 991. Addressing the screen begins with initializing an index j 940 for the transmission pulses and an index i 941 for the data subsets. Block 942 represents the time spent turning all of the array elements OFF using a reset implementation (generally applied globally). Then 943 loads the current data subset to the array and actuates desired elements to ON. Note that in general 942 and 943 can each be handled by triggering a reset event subarray by subarray. Once all current subset elements are ON, the transmission pulse is turned ON in 944 for the predetermined time interval $s_{ij}$ of 945. After the interval $s_{ij}$ is over, the transmission pulse is turned OFF in 946. Until the subset index equals the number of data subsets in 947, the subset index is incremented by 948 such that the process 942 through 946 is repeated for all data subsets of transmission pulse j. Once all data subsets for pulse j have been loaded and processed, the transmission pulse j is incremented 950 until all transmission pulses have been activated 949. Once j=$N_p$ in 949 the algorithm in 990 is repeated for the next data set.

From the 6-bit example of FIG. 9, the data set time 810 equals 63 times LSB 806 plus 6 times the array time 811, or data set time 810 equals ($2^n-1$) times the LSB time plus n times the array time 811 for an n-bit per primary system. Thus, the timing of the array is dependent upon the two time periods the array time 811 and the LSB 806. The time used to address the array 811 can be expressed as the array time 811 is equal to $N_{subarray}t_{on}+t_{off}n$. The times $t_{on}$ and $t_{off}$ are based upon the inherent physics of the array elements, array control electronics, and expected array timing where $t_{on}$ is the time required to address a subarray for turning elements ON, and $t_{off}$ is the time required to clear the array to set all elements OFF. Included in both $t_{on}$ and $t_{off}$ is the time associated with loading the necessary data and the response time of the array elements. After choosing suitable values for $t_{on}$ and $t_{off}$, one can then solve for LSB, where ($2^n-1$)LSB is the amount of time that data is transmitted (displayed to the observer, in the case of a video display application of this encoding method). Thus, as the times $t_{on}$ and $t_{off}$ (and thus the array time 811) become shorter, the array becomes more data efficient because data is presented for a larger percentage of the time.

An example calculation shows the great benefit of this encoding method in the application of a display using FSC. Assume $t_{on}$=0.5 μsec, $t_{off}$=10 μsec, a video display configured to emit 18-bit color, with $N_{color}$=3, and $N_{rows}$=768 to produce an absolute optical output near 58% that of the two unoptimized encoding methods presented in FIGS. 1 and 2. The savings from applying the present invention to a display using this full PWM binary encoding for FSC is that the fundamental response time of the pixels has been slowed tremendously, at the expense of absolute optical output, but not at the expense of either power efficiency or fewer screen colors (i.e. less information). The faster one can actuate the pixel (i.e. reduce $t_{on}$ or $t_{off}$), the higher the absolute maximum output intensity of the screen, but the display still produces the same number of colors (18-bit color for the example embodied in FIG. 9) while its optical output per electrical watt of input power remains unchanged. The other encoding schemes do not have this advantage since addressing the array (screen) is directly tied to the amount of information (number of colors) desired by the LSB. The encoding scheme of the present invention can be successfully implemented when the array time 811<LSB 806 or the array time 811>LSB 806.

The ultimate clock speed required depends upon the number of bits present in the input data and the memory of the shift registers that distribute the data to the control lines. In other words, exigencies of the actual application, rather than the factors specific to the present invention, determine ultimate clock speed. However, the clock speed can clearly be minimized by using full PWM binary encoding as disclosed herein. Since the speed at which one addresses the array can vary, so can the clock speed for sending data.

The invention claimed is:

1. A method of encoding a data set for transmission and subsequent decoding by a user or a reading system via an N-dimensional array, said method comprising:

the data set comprising informational content of the N-dimensional array of values;

decomposing the data set into one or more data subsets and corresponding transmission source values, wherein the transmission of a combination of one of the data subsets and corresponding transmission source values in synchronization provides a means to decode the data subset so as to recover the informational content; and loading each of the data subsets to array elements that have discrete number of states, wherein loading each of the data subsets comprise equally splitting a sequence of n bits and loading a first half and a second half of the sequence of n bits in consecutive phases, respectively, such that during a first phase a first portion of the data subset corresponding to a series of most significant bits specifies a first constant value of a transmission source and also species the discrete state of each of the array elements for each bit of the series of most significant bits, and during a second phase a second portion of the data subset corresponding to a series of least significant bits specifies a second constant value of the transmission source and also specifies the discrete state of each of the array elements for each bit of the series of least significant bits.

2. The method of claim 1 wherein the second constant value is set equal $\frac{1}{2}^{(n/2)}$ times the first constant value.

3. The method of claim 2 wherein during the first portion of the data subset the transmission source is set to continuously provide light at the first constant value while controlling the discrete state of each of the array elements between ON and OFF states as specified by each bit of the series of most significant bits, and wherein during the second portion of the data subset the transmission source is set to continuously provide light at the second constant value while controlling the discrete state of each of the array elements between ON and OFF states as specified by each bit of the series of least significant bits.

4. The method of claim 2 wherein the transmission source comprises one or more light sources configured to provide light at various intensity levels.

5. A method of encoding a data set for transmission and subsequent decoding by a user or a reading system via an N-dimensional array, said method comprising:

the data set comprising informational content of an N-dimensional array of values;

decomposing the data set into one or more data subsets and corresponding transmission source values, wherein the transmission of a combination of one of the data subsets and corresponding transmission source values in synchronization provides a means to decode the data subset so as to recover the informational content; and loading each of the data subsets to array elements that have a discrete number of states, wherein loading each of the data subsets comprises loading a sequence of n bits in consecutive phases such that during a first phase a first portion of the data subset corresponding to a series of most significant bits specifies a single constant value of a transmission source and also specifies the discrete state of each of the array elements for each bit of the series of most significant bits, and during a second phase a second portion of the data subset corresponding to a series of least significant bits specifies the single constant value and a transmission pulse width of the transmission source and also specifies the discrete state of each of the array elements for each bit of the series of least significant bits.

6. The method of claim 5 wherein an array address time for each bit of the series of least significant bits is for the same duration.

7. The method of claim 6 wherein during each bit of the series of least significant bits the transmission source is controlled ON and OFF via pulse width modulation.

8. The method of claim 7 wherein the transmission source is pulse width modulated for decreasing time periods during each sequential bit in the series of least significant bits.

9. The method of claim 7 wherein the transmission source is OFF while the array elements are changing states.

10. The method of claim 5 wherein the transmission source comprises one or more light sources configured to provide light at a single intensity level.

11. The method of claim 10 wherein an array address time for each bit of the series of least significant bits is for the same duration, and wherein during each bit of the series of least significant bits the one or more light sources are controlled ON and OFF via pulse width modulation.

12. The method of claim 8 wherein the transmission source is pulse width modulated in a binary weighted scheme.

13. The method of claim 11 wherein the one or more light sources are OFF while the array elements are changing states.

14. The method of claim 11 wherein the one or more light sources are pulse width modulated in a binary weighted scheme.

15. The method of claim 6 wherein an array address time for each bit of the series of most significant bits decreases during processing of each sequential bit in the series of most significant bits.

* * * * *